United States Patent [19]

Iwata

[11] Patent Number: 4,621,331
[45] Date of Patent: Nov. 4, 1986

[54] CONTROL SYSTEM FOR GRASPING FORCE OF A MANIPULATOR FOR GRASPING OBJECTS

[75] Inventor: Kazuhide Iwata, Yokohama, Japan

[73] Assignee: Tokyo Shibaura Denki Kabushiki Kaisha, Kawasaki, Japan

[21] Appl. No.: 566,396

[22] Filed: Dec. 28, 1983

[30] Foreign Application Priority Data

Dec. 28, 1982 [JP] Japan ................... 57-227412

[51] Int. Cl.$^4$ .............. B25J 15/00; B25J 15/02; B66C 1/00
[52] U.S. Cl. ..................... 364/513; 901/31; 901/33; 901/38; 414/730
[58] Field of Search ............... 364/513, 167, 169, 170, 364/478; 414/5, 6, 730; 901/31, 33, 38, 3, 4, 5, 9, 10, 46, 50

[56] References Cited

U.S. PATENT DOCUMENTS

| | | | |
|---|---|---|---|
| Re. 31,581 | 5/1984 | Richter | 414/730 |
| 3,251,483 | 5/1966 | Devol | 364/513 |
| 4,367,532 | 1/1983 | Crum et al. | 364/513 |
| 4,408,286 | 10/1983 | Kikuchi et al. | 364/513 |
| 4,510,574 | 4/1985 | Guittet et al. | 364/513 |
| 4,530,062 | 7/1985 | Inaba et al. | 364/513 |
| 4,530,636 | 7/1985 | Inaba et al. | 901/31 |

FOREIGN PATENT DOCUMENTS

| | | | |
|---|---|---|---|
| 49-3351 | 12/1974 | Japan . | |
| 0033253 | 3/1977 | Japan | 901/33 |
| 0033254 | 3/1977 | Japan | 901/33 |
| 964423 | 12/1978 | Japan . | |

OTHER PUBLICATIONS

Proceedings of the 4th International Symposium on Industrial Robots (Nov. 1974), M. Ueda et al, "Sensors and Systems Necessary for Industrial Robots in the Near Future", pp. 79-88.

Automatica, vol. 11, pp. 567-570, Pergamon Press, 1975, "Multifunctional Terminal Device with Adaptive Grasping Force".

*Primary Examiner*—Jerry Smith
*Assistant Examiner*—Jon D. Grossman
*Attorney, Agent, or Firm*—Oblon, Fisher, Spivak, McClelland & Maier

[57] ABSTRACT

A manipulator having a grasping mechanism for grasping an object and an arm mechanism for lifting the grasped object, is disclosed. A weight detector is provided which detects a force that the top of the arm mechanism receives in the gravitational direction when the grasped object is being lifted. In order to find the minimum grasping force sufficient to lift the object, a grasp detector is provided for detecting, from the output of the weight detector, that the object cannot be lifted up with the present grasping force and a desired grasping force selector for selecting successively a desired value of grasping force starting from a predetermined minimum desired value until it is detected that the object is lifted. A grasping force control circuit controls the grasping force to the selected desired value.

6 Claims, 12 Drawing Figures

CONTROL SYSTEM FOR GRASPING FORCE OF A MANIPULATOR FOR GRASPING OBJECTS

BACKGROUND OF THE INVENTION

This invention relates to a manipulator for grasping an object.

1. Field of the Invention

Recently, industrial robots or manipulators are being extensively introduced in various industrial fields for labor saving purpose. In plants, manipulators which can grasp objects and transfer them to a predetermined position are essential.

At present, however, since most manipulators have no judgement function, it is difficult for them to make an action which can be executed very easily by a man. For example, it is difficult for conventional manipulators to grasp deformable objects, e.g., a paper cup.

2. Discussion of Background

Systems which utilize a slippage detector or a weight detector have been proposed for finding an optimum grasping force sufficient to lift up any one of various objects including a heavy and rigid object and a light and fragile object. The former system is disclosed in a paper entitled "Multifunctional Terminal Device with Adaptive Grasping Force", Automatica, Vol. 11, p-p 567–570, Pergamon Press, 1975. In this system, as shown in FIG. 1, a slippage detector 1 is provided on the inner surface of a finger 2 of a grasping mechanism 3. If, when lifting an object 4, the grasping force applied to fingers 2 grasping the object is insufficient, it will begin to slip relative to the fingers. The slippage detector 1 detects the slippage in order to increase the grasping force.

With the system using a slippage detector, if the surface of an object is irregular, there are some cases where it is not possible to detect a slippage. Therefore, it is difficult to perform highly precise grasping force control. If the slippage detector projects from the surface of a finger, the applied grasping force is concentrated on the detector. For this reason, the surface of the detector and that of the finger must be flush with each other. However, this complicates the grasping mechanism. In addition, there is no guarantee that the slippage detector reliably touches a grasped object. Further, due to the presence of the slippage detector the maintenance and inspection of the grasping mechanism become difficult.

The system in which the weight of an object is detected is disclosed in Japanese Patent Publication No. 44744/53 (1978). In this system, since an operation of raising an arm grasping an object, stopping it and then checking whether the object has been lifted, is repeated a number of times, a considerable amount of time is required for determining an optimum grasping force.

SUMMARY OF THE INVENTION

An object of the invention is to provide a manipulator, which can readily determine an optimum grasping force to grasp an object without use of any special mechanism.

The manipulator according to the invention, comprises a grasping mechanism for grasping an object with a controllable grasping force, an arm mechanism coupled to the grasping mechanism and capable of being raised to lift up the grasped object and a control circuit for controlling the grasping force provided by the grasping mechanism.

To attain the object of the invention, the industrial manipulator further comprises a weight detecting means for detecting a force exerted to the arm mechanism in the gravitational direction when an object grasped by the grasping mechanism is lifted; a grasp detecting means responsive to the weight detecting means for detecting whether the object can be lifted up with a present grasping force applied to the grasping mechanism or not; and a desired grasping force selecting means responsive to the grasp detecting means for increasing a desired value of grasping force of the grasping mechanism stepwise from a preset minimum value until it is detected that the object is lifted. The control circuit is supplied with the minimum desired value of grasping force sufficient to lift the object selected by the desired grasping force selecting means so that the grasping mechanism grasps the object with the minimum grasping force sufficient to lift up the object.

According to the invention, the decision as to whether an object has been lifted up by the present grasping force, is done on the basis of the fact that a slippage occurs between the object and grasping mechanism when the object fails to be lifted up. The slippage can be detected by generation of a peak in an output signal of the weight detecting means. The desired grasping force can be switched every time a peak occurs in the output signal of the weight detecting means. In this case, however, a large deviation of the position at which the object is grasped may occur. The grasping detecting means may be designed such that, after the first peak is detected, the desired grasping force can be progressively varied by making use of predictive values of the grasping force at which peak will be generated.

DETAILED DESCRIPTION OF THE PREFERRED EMBODIMENT

Figure 1:
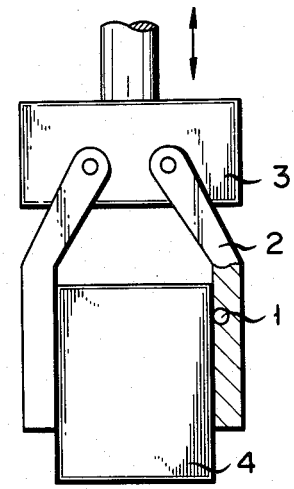
FIG. 1 shows a prior art manipulator arranged to grasp an object.
Figure 2:
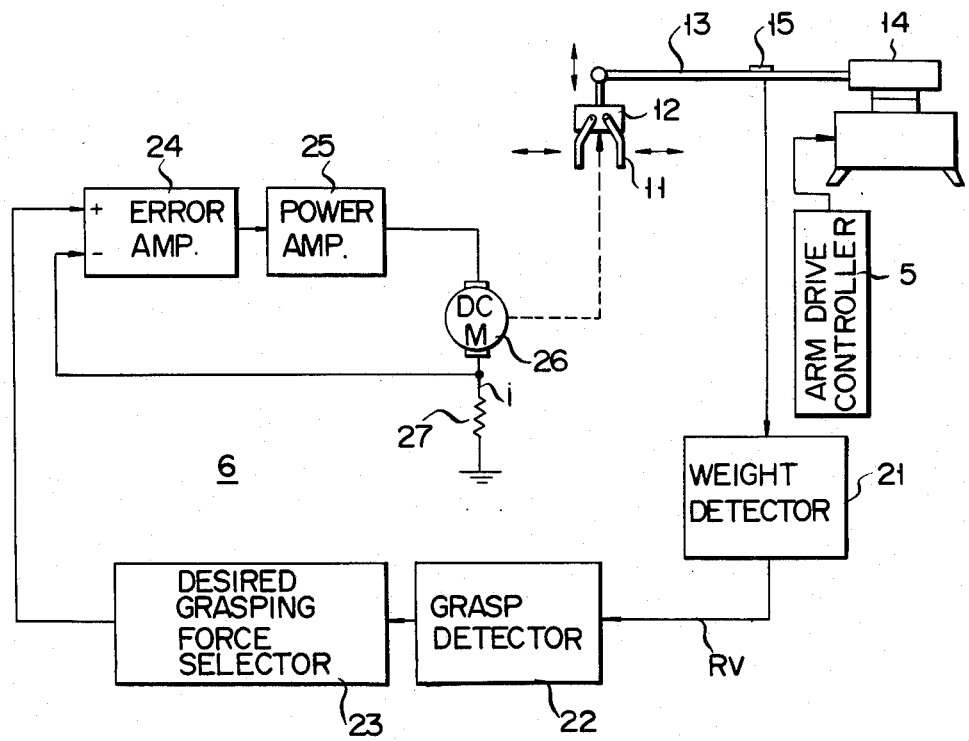
FIG. 2 is a block diagram of a grasping force control system according to the invention.

Referring to FIG. 2, a manipulator to which the invention may be applied is shown which comprises a grasping mechanism 12 for driving grasping fingers 11, an arm mechanism 13 coupled to the grasping mechanism 12, a base 14 for supporting and driving arm mechanism 13, and control circuits for controlling these mechanisms 12 and 13. The control circuit comprises a circuit 6, the subject matter of the invention, for controlling a grasping force applied to an object by fingers 11 and a control circuit 5 for causing arm mechanism 13 to be raised by a motor so as to lift the grasped object.

A strain gauge 15 is attached to arm 13 for detecting the strain produced in the arm 13 when an object is being lifted up. The strain gauge 15 is adapted to detect the weight of the grasped object.

In a grasping force control system shown in FIG. 2 according to the invention, the strain gauge 15 is coupled to a weight detecting circuit 21, which detects force that the tip of arm 13 receives in the gravitational direction on the basis of the strain caused in arm 13 when a grasped object is lifted up, to produce a weight signal $Rv$. The weight signal $Rv$ is fed to a grasp detector 22, which detects a change in the weight signal $Rv$ (i.e., a peak thereof) resulting from the transition of the friction between fingers 11 and the grasped object, from a static friction to a dynamic friction. The transition of the friction from static friction to dynamic friction indicates the generation of a slippage between the fingers 11 and object. The output of grasp detector 22 is coupled to a desired grasping force selector 23. The circuit 23 has a memory which stores a pattern of desired grasping force values which increase stepwise at a uniform interval with the weight of the object. In an initial stage of operation, the minimum grasping force is selected. The selected grasping force is progressively increased stepwise every time the slippage detector 22 detects a peak of the weight signal $Rv$.

The desired value of grasping force selected by desired grasping force selector 23 is fed to a non-inverting input terminal of an error amplifier 24, which is preferably an operational amplifier, in the servo system for the grasping force control. The output of error amplifier 24 is coupled to a power amplifier 25 for driving a DC motor 26. The DC motor 26 is adapted to drive fingers 11 of manipulator, and the grasping force provided by fingers 11 is proportional to current i of DC motor 26. The current i of DC motor 6, i.e., the grasping force of fingers 11, is detected by a resistor 27. The detected grasping force is fed back to an inverting input terminal of error amplifier 24. With the servo system as described above, the grasping force of fingers 11 is set to a desired value selected by desired grasping force selector 23. The grasping force is progressively increased, and ultimately the minimum grasping force sufficient to grasp an object is selected.

According to the invention, a decision is made as to whether the grasped object has been lifted up. If the object is not lifted up, the grasping force is increased step by step. In this way, the minimum grasping force necessary for lifting the object is selected. Now, the principles underlying the decision as to the grasped object has been lifted up, will be described.

Figure 3A:
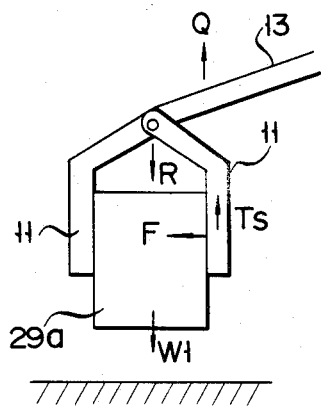
FIGS. 3A to 3D are diagrams for explaining the principles of decision of the grasping force according to the invention.
Figure 3B:
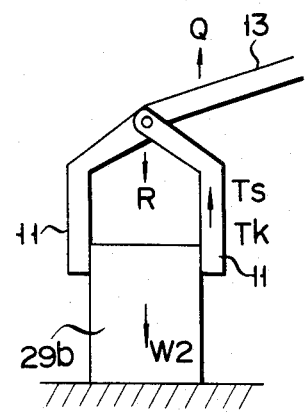

FIG. 3 shows a case in which the grasping force is sufficient so that an object 29a could be lifted, while FIG. 3B shows a case in which the grasping force is insufficient so that an object 29b could not been lifted up.

Denoting the weights of objects 29a and 29b of the same material by $W_1$ and $W_2$ ($W_1 < W_2$), the force acting on the surfaces of fingers 11 (i.e., grasping force) by F and the coefficients of static and dynamic frictions between fingers 11 and object by $\mu_s$ and $\mu_k$, $$T_{sm} = \mu_s F,$$

$$T_k = \mu_k F,$$

and $$T_{sm} > T_k$$

where $T_{sm}$ is the maximum value of static frictional force $T_k$ is dynamic frictional force.

Figure 3C:
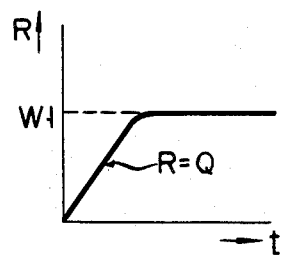

In the case of FIG. 3A, a relation $$T_{sm} = \mu_s F \geqq W_1$$

is held between the weight $W_1$ of object 29a and the static frictional force, so that the object is lifted up. Denoting the force for vertically moving arm 13 by Q (which is positive in the raising direction), the force R received by the tip of arm 13 in the gravitational direction after the start of the rising of arm 13 varies as shown in FIG. 3C. Until the object 29a is lifted up, the static frictional force in the gravitational direction is in equilibrium with Q, so that R increases in proportion to Q. When the object 29a has been lifted up, the force received by the tip of arm 13 in the gravitational direction is $W_1$.

Figure 3D:
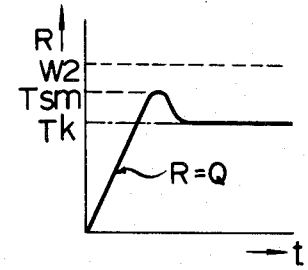

In the case of FIG. 3B, $T_{sm} < W_2$, so that the object 29b is not lifted. In this case, R is increased in proportion to Q in the range in which Q is smaller than $T_{sm}$ as shown in FIG. 3D. When Q is increased beyond $T_{sm}$, a slippage occurs between fingers 11 and object 29b. At this time, the force acting in the gravitational direction is changed from static frictional force to dynamic frictional force, so that R is varied as shown in FIG. 3D. It will be seen that a peak is generated in R. This peak permits distinct discrimination between the case of FIG. 3D and the case of FIG. 3C. That is, the decision as to whether the object has been lifted up can be made on the basis of generation of this peak.

A practial arrangement of the grasping force control system which is based on the principle described above will now be described.

Figure 4:
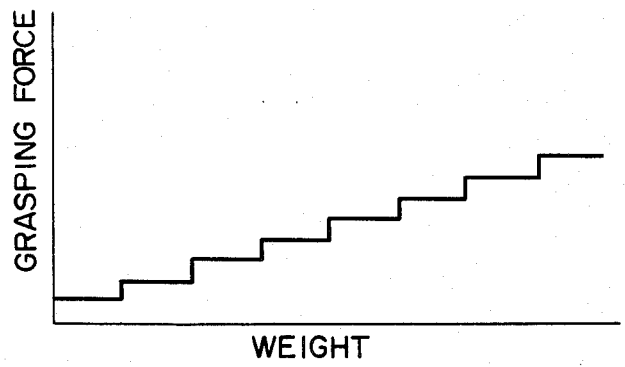
FIG. 4 shows a desired grasping force pattern.
Figure 5:
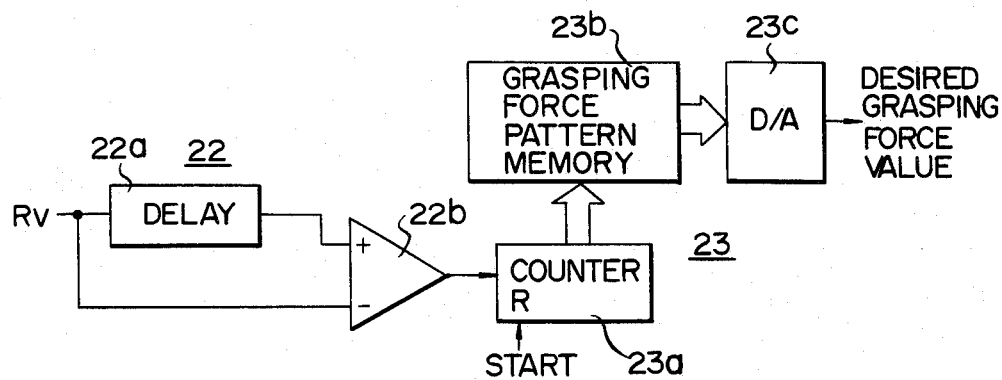
FIG. 5 is a block diagram of a practical arrangement of grasp detector and desired grasping force selecting circuit shown in FIG. 2.

FIG. 5 shows a practical arrangement of grasp detector 22 and desired grasping force selector 23. The weight signal $Rv$ from weight detector 21 is coupled to grasp detector 22 which is a differential circuit comprised of a delay circuit 22a and a comparator 22b. The differential circuit produces a pulse output whenever a slippage occurs between fingers 11 and the object when the arm 13 is raised at a constant rate. The pulse output is counted by a counter 23a in the desired grasping force selector 23. The selector 23 includes a read only memory (ROM) 23b which stores a pattern of desired grasping forces which increasingly changes step by step from the minimum grasping force as shown in FIG. 4. The memory 23b is accessed by counter 23a. A desired grasping force value corresponding to the count of counter 23a is read out of memory 23b to be fed to a digital-to-analog converter 23c so that a corresponding analog signal is obtained. The analog signal is fed to error amplifier 24. The counter 23a is reset by a reset signal at the start of grasping operation. As a result, the minimum desired grasping force value is selected as the initial grasping force. The memory 23b and digital-to-analog converter 23c may be replaced with analog circuits. Obviously, it is possible to arrange such that one of a plurality of switches is enabled by the output of counter 23a so that a corresponding analog voltage is applied to error amplifier 24 through the enabled switch.

Figure 6:
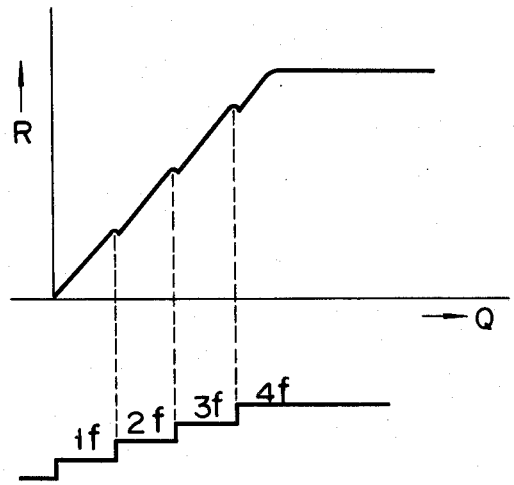
FIG. 6 is a diagram for explaining the operation of the arrangement of FIG. 5.

FIG. 6 shows the operation of the arrangement of FIG. 5. An object is first grasped with the minimum grasping force $1f$. The grasping force increases stepwise in the order of $2f, 3f, \ldots$ whenever a peak is generated in the weight signal Rv. By increasing the grasping force stepwise as shown, the minimum grasping force necessary for lifting the object can be found. In the illustrated example, the object is lifted up with a force 4f. After the object has been lifted up, the weight signal Rv remains unchanged. By making use of this fact it is detected that the object has been lifted up.

While the arrangement of FIG. 5 is simple in construction, if the minimum grasping force lf is set to a very small value for subtle grasping force control, the number of times of peak detection, i.e., the number of times of occurrence of a slippage between the fingers and object, is increased so that the position, at which the object is grasped, is liable to be greatly deviated from the initial position. Evidently it is desired that the object grasping position should not be deviated.

Figure 7:
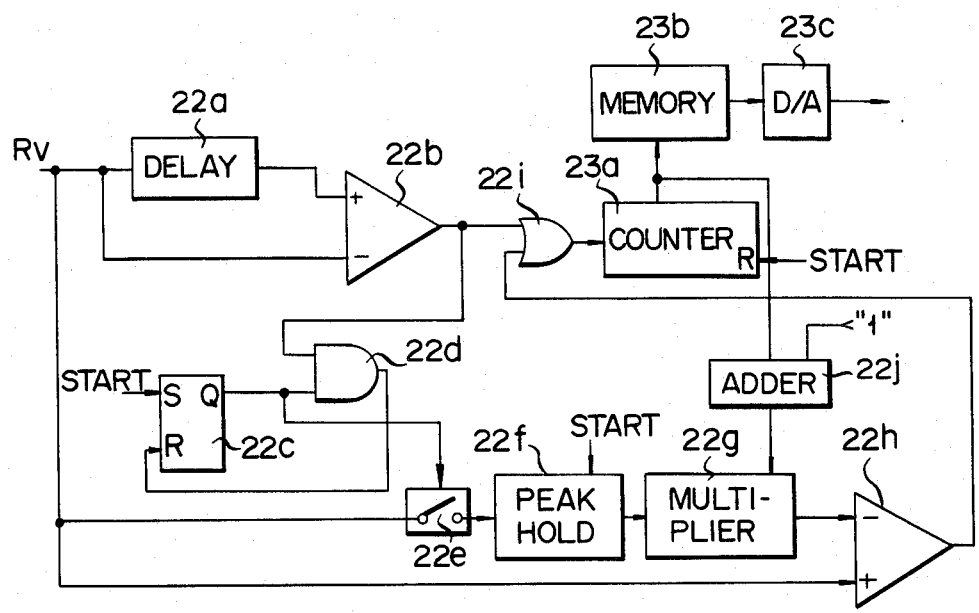
FIG. 7 shows another arrangement of the grasp detector.

FIG. 7 shows an arrangement which can minimize the deviation of the object grasp position. In the Figure, the same parts as those in FIG. 5 are designated by like reference numerals.

Again in this instance, the arm holding the object is raised at a constant rate, and the detection of a peak of the weight signal Rv is effected by delay circuit 23a and comparator 22b. The difference of this arrangement from the arrangement of FIG. 5 is that the first peak value is held by a peak hold circuit, and subsequently the grasping force is increased by one step before generation of any peak. That is, no subsequent peak is generated.

Figure 8:
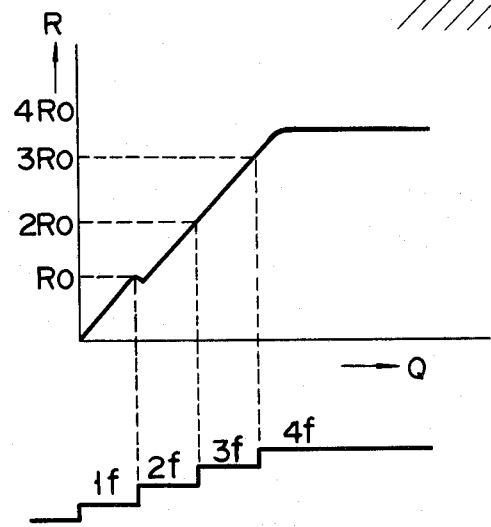
FIG. 8 is a diagram for explaining the operation of the arrangement of FIG. 7.

Referring to FIG. 7, the weight signal Rv from weight detector 21 is fed through an electronic switch 22e to a peak hold circuit 22f. The electronic switch 22e is turned on by output Q of a flip-flop 22c which is set by a start signal. When the flip-flop 22c is set, an AND gate 22d is enabled. The flip-flop 22c is reset by a first slippage detection pulse which is provided from comparator 22b through AND gate 22d. As a result, the electronic switch 22e is turned off, so that the first peak value is held by peak hold circuit 22f. At the same time, the counter 23a is incremented. The output of peak hold circuit 22f is fed to a multiplier 22g. An adder 22j is provided to add 1 to the count of counter 23a. The multiplier 22g multiplies the peak value held in the circuit 22f by the count of counter 23a plus one. When the first peak value is Ro, as shown in FIG. 8 the output of multiplier 22g indicates a value of 2Ro at the instant of the generation of the first peak detection pulse, which is a predictive value at which the next slippage will occur. The output of comparator 22g is compared to the weight signal Rv in a comparator 22h. When the weight signal Rv exceeds the predictive value 2Ro before occurrence of the next slippage, the comparator 22h produces a pulse output which increments counter 23a through an OR circuit 22i. As a result the next desired grasping force value 2f is read out from memory 23a to increase the grasping force of fingers 11 by one step. In this way, the grasping force is progressively increased step by step to 2f, 3f, ... as the force R received by the tip of the arm 13 reaches successive predictive values 2Ro, 3Ro, ... It is to be understood that in this embodiment the minimum grasping force necessary for lifting the grasped object can be found solely by the first slippage between the fingers and object. It is thus possible to minimize the deviation of the object grasp position. The start signal is supplied to peak hold circuit 22f, whereby a peak hold capacitor is discharged prior to the start of the grasping operation.

In the arrangement of FIG. 7, the outputs of comparators 22b and 22h are coupled through OR gate 22i to counter 23a. Thus, even in the event if a slippage occurs between the fingers and grasped object before the weight signal Rv the reaches the predictive values 2Ro, 3Ro, ..., the grasping force can also be increased by one step at this moment. For example, when a slippage occurs before the weight signal Rv reaches the predictive value 2Ro, the counter 23a is incremented by a slippage detection pulse from comparator 22b. As a result, the grasping force increases from 2f to 3f. If no subsequent slippage occurs, the counter 21a is incremented by comparator 22h.

Although in the above embodiment, a strain gauge is used for detecting the weight of a grasped object, a piezoelectric element or a laser beam may be used instead. The manipulator according to the invention may also be used to check whether an object has a prescribed weight or not, i.e., as a weight checker.

Figure 9:
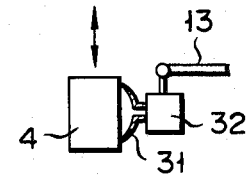
FIG. 9 shows a modification of the grasping mechanism which may be used in this invention.

The grasping mechanism used in this invention may be of other types. For example, as shown in FIG. 9, a hand 32 may be used which has an air-sucking member 31 such as a sucker for lifting an object 3 by sucking air. In this case, the object 4 can be handled with an optimum force by controlling an air-sucking amount of the sucking members 31.

What is claimed is:

1. A manipulator comprising:
   a grasping mechanism for grasping an object with a controllable grasping force:
   an arm mechanism coupled to said grasping mechanism and arranged to be capable of being raised to lift said object grasped by said grasping mechanism;
   grasping force control means coupled to said grasping mechanism for controlling a grasping force applied to said grasping mechanism to grasp said object;
   weight detecting means coupled to said arm mechanism for detecting a force on said arm mechanism;
   grasping detecting means responsive to said weight detecting means for detecting whether or not the grasped object has been lifted up by a present force being applied to said grasping mechanism; and
   grasping force selecting means coupled to said grasping force control means and responsive to said grasp force being applied to said grasping mechanism by said grasping force control means from a predetermined minimum force level until said grasp detecting means detects that the object has been lifted;
   said grasp detecting means being arranged to detect a peak generated in an output signal of said weight detecting means due to a slippage which occurs a between the object and said grasping mechanism; and said grasping force selecting means including counter means for counting peaks generated in the output signal of said weight detecting means; and memory means for storing, in different memory locations of said memory means which are designated by count values of said counter means, data representing levels of grasping forces to be applied to said grasping mechanism which stepwise increase from the predetermined minimum force level, said memory means being coupled to said counter means, so that grasping force data corresponding to a count value of said counter means is read out of said memory means and applied to said grasping force control means to apply to said grasping mechanism a grasping force corresponding to the count value in said counter means.

2. The manipulator according to claim 1, wherein said grasp detecting means include a delay circuit for delaying an output signal of said weight detecting means and comparator for comparing the level of an output signal of said delay circuit with the level of the output signal of said weight detecting means in order to produce an output signal representing the slippage occuring between the grasped object and said grasping mechanism.

3. A manipulator comprising:

a grasping mechanism for grasping an object with a controllable grasping force;

an arm mechanism coupled to said grasping mechanism and arranged to be capable of being raised to lift said object grasped by said grasping mechanism;

grasping force control means coupled to said grasping mechanism for controlling a grasping force applied to said grasping mecansim to grasp the object;

weight detecting means coupled to said arm mechanism for detecting a force on said arm mechanism;

grasping detecting means responsive to said weight detecting means for detecting whether or not the grasped object has been lifted up by a present force being applied to said grasping mechanism; and grasping force selecting means coupled to said grasping force control means and responsive to said grasp detecting means for stepwise increasing therefore a grasping force being applied to said grasping mechanism by said grasping force control means from a predetermined minimum force level until said grasp detecting means detects that the object has been lifted;

said grasping force selecting means including;

counter means for counting peaks generated in an output signal of said weight detecting means which occur due to slippage between the object and said grasping mechanism; and memory means for storing, in different memory locations of said memory means which are designated by count values of said counter means, data representing levels of grasping forces to be applied to said grasping mechanism which stepwise increase from the predetermined minimum force level, said memory means being coupled to said counter means, so that grasping force data corresponding to a count value of said counter means is read out of said memory means and applied to said grasping force control means to apply to said grasping mechanism a grasping force corresponding to the count value in said counter means; and said grasp detecting means including;

peak detecting means for detecting the peaks generated in the output signal of said weight detecting means;

hold means coupled to said weight detecting means and said peak detecting means and responsive to detection of a first peak in the output signal of said weight detecting means for holding a first peak value in the output signal of said weight detecting means;

multiplying means coupled to said peak hold means and counter means for multiplying the first peak value held in said peak holds means by a value corresponding to a count value in said counter means; and comparing means coupled to said multiplying means and said weight detecting means for comparing the level of the output signal of said weight detecting means with the level of an output signal of said multiplying means, wherein the output signals of said comparing means and said peak detecting means are adapted to increment said counter means in said grasping force selecting means.

4. The manipulator according to claim 3, wherein said value corresponding to a count value in said counter means is the count value plus one.

5. A manipulator comprising:

a grasping mechanism for grasping an object with a controllable grasping force, the frictional force between said grasping mechanism and said object varying from static frictional force to dynamic frictional force when a slippage occurs between said grasping mechanism and said object;

an arm mechanism coupled to said grasping mechanism and arranged to be capable of being raised to lift said object grasped by said grasping mechanism;

grasping force control means coupled to said grasping mechanism for controlling a grasping force applied to said grasping mechanism to grasp the object;

weight detecting means coupled to said arm mechanism for detecting a force applied to said arm mechanism when the grasped object is being lifted, the force applied to said arm mechanism instantaneously varying in response to the variation of the frictional force between said grasping mechanism and said object from the statical frictional force to the dynamic frictional force;

grasping detecting means coupled to said weight detecting means for detecting whether or not the grasped object has been lifted by a present force being applied to said grasping mechanism, said grasping detecting means being arranged to detect that said object has not been lifted, in response to the detection of the instantaneous variation of the frictional force between said grasping mechanism and said object by said weight detecting means; and grasping force selecting means coupled to said grasping force control means and responsive to said grasp detecting means for stepwise increasing a grasping force being applied to said grasping mechanism by said grasping force control means from a predetermined minimum force level until said grasp detecting means detects that the object has been lifted.

6. The manipulator according to claim 5, wherein said weight detecting means comprises a strain gauge attached into said arm mechanism.

* * * * *